United States Patent [19]

Sear

[11] 4,172,767
[45] Oct. 30, 1979

[54] WATER PURIFICATION SYSTEM

[76] Inventor: Walter E. Sear, 235 W. 46th St., New York, N.Y. 10036

[21] Appl. No.: 861,239

[22] Filed: Dec. 16, 1977

Related U.S. Application Data

[63] Continuation of Ser. No. 708,784, Jul. 26, 1976, abandoned.

[51] Int. Cl.² .............................. F24J 3/02; B01D 3/00
[52] U.S. Cl. ..................................... 202/182; 202/234; 203/10; 203/49; 203/DIG. 1; 159/1 S; 210/63 R; 261/DIG. 79
[58] Field of Search .................... 203/10, 11, 100, 49, 203/DIG. 1, DIG. 17; 202/234, 185 A–185 E, 185 R, 182; 210/63 R, 220; 261/DIG. 79, 152; 159/1 S, 1 SF

[56] References Cited

U.S. PATENT DOCUMENTS

| 983,424 | 2/1911 | Brosius | 203/DIG. 1 |
|---|---|---|---|
| 2,006,985 | 7/1935 | Claude et al. | 203/10 |
| 2,803,591 | 8/1957 | Coanda et al. | 203/DIG. 1 |
| 3,015,613 | 1/1962 | Edmondson | 203/DIG. 1 |
| 3,135,466 | 6/1964 | Reid | 203/DIG. 1 |
| 3,135,466 | 6/1964 | Reid | 159/1 SF |
| 3,159,554 | 12/1964 | Mount | 159/1 SF |
| 3,168,450 | 2/1965 | Black | 203/10 |
| 3,235,877 | 2/1966 | Grob | 261/DIG. 79 |
| 3,257,291 | 6/1966 | Gerber | 202/234 |
| 3,642,583 | 2/1972 | Greenberg et al. | 202/234 |
| 3,875,926 | 4/1975 | Frank | 203/DIG. 1 |

Primary Examiner—Wilbur L. Bascomb, Jr.

[57] ABSTRACT

An integral water purification system including a tank for containing unclean water located at the source with continual replenishment of said water in the tank, a cover for the tank to accumulate natural heat by the elimination of any disturbances by the elements and to aid such accumulation by the rays of the sun in order to vaporize the unclean water, a blower for moving the vapor to a pipe leading from an area of one temperature to an area of another and lower temperature such as from the crest to the depth of the sea, whereby the vapor is condensed into droplets and accumulated in a condensing unit as pure water and a pump to force the water from the final condenser to a fresh water storage tank for later use whereby potable water is obtained from unclean water with the use of natural forces and with a minimum of expenditure of artificial energy sources.

4 Claims, 4 Drawing Figures

WATER PURIFICATION SYSTEM

This is a continuation, of application Ser. No. 708,784 filed on July 26, 1976.

BACKGROUND OF THE INVENTION

Heretofore there have been a variety of proposals involving apparatus for the purification of water, especially for the desalinization of the existing water supply which is available from the ocean depths. However, the various attempts at such purification have proven to be overly costly and expensive as they contemplate the use of large cumbersome machinery and equipment for the transportation of the water to be purified over large distances whereby the proposals have become somewhat impractical for use where it is necessary. It is, in fact, known that some of the greatest shortages of available drinking and potable water are in the vicinity of water which is available but impossible to utilize because of the great impurities therein. It is, of course, well-known that steam or the vapors which emanate from heated or boiling water is a source of pure water supply upon the condensation thereof. However, little, if any, equipment has been proposed to reclaim and purify this available water in situ absent in expensive cumbersome and difficult to maintain machinery.

SUMMARY OF THE PRESENT INVENTION

The present invention is designed to overcome these difficulties by providing apparatus and systems for obtaining highly potable water from salt water for water which would otherwise be impossible to ingest. In accomplishing this result, the present invention contemplates the use of the natural heat generated by the sun and therefore requires little, if any, machinery which could provide a drain on energy sources. The concept of the invention involves the provision of a system comprising a tank into which salt water or impotable water normally flows or settles, such as a tank into which sea water can flow or a settling tank.

The top of this tank will be covered by a plastic cover which, for economy's sake, may be made of conventional plastic or other suitable material which is able to accommodate and pass the heating rays of the sun. The sun's rays passing through this plastic cover will cause the water captured within the tank portion to vaporize at an astonishingly rapid rate. As a result, the water within the settled tank or from the sea will become vaporized within the upper portion of the cover and above the sea water or settling material arising in the form of moisture-laden air.

This moisture-laden air is then conveyed by a blower arrangement utilizing only a modest amount of energy into a pipe line of any suitable material. In the settling tank arrangement the normal cold water aerator means which are present in the form of a fountain in most such units is used to condense the water as it passes through the line so arranged as to take maximum benefit from the line of travel of the aerated water.

A fluid pump is provided in the line from the condenser and pumps the pure water into a fresh water storage tank where it can be stored pending transportation to the source using the fresh water.

The system thus provided in effect uses only two modest amounts of energy to accomplish a potable water from salty or unclean sources, i.e. the fan arrangement necessary for the blower which would require little horsepower as it is only moving moisture-laden air and the pump arrangement used to transport the water from the condenser to the fresh water tank. Where necessary, as for example, in connection with utilization of sea water, an outlet from the condenser may be provided for the emission of any fumes emanating within the condenser as the vapor is being converted to water. The escape of the fumes need only be a pipe extending above the sea level.

The entire unit may be a supported float arrangement in which parts are suspended above the sea level while others are anchored below the sea. Alternatively, it may comprise a series of supported apparatus disposed in tandem on land whereby vapors emanating from an existing settling tank can pass through a condenser utilizing part of presently existing aerating fountains during its transformation into fresh potable water. While the invention will be described in relation to two embodiments thereof, it is to be understood at the outset that these embodiments are not to be considered to be limitations upon the scope of the invention.

DETAILED DESCRIPTION OF THE INVENTION

It is of paramount importance in various sections of the world at the present time to provide means for increasing the supply of potable water. It is also of great importance that these means do not constitute an inordinate drain upon presently available energy sources. The present invention presents an effective and economic solution to the first problem, viz. providing a fresh or potable water supply while not presenting any great imposition upon available energy means.

Figure 1:
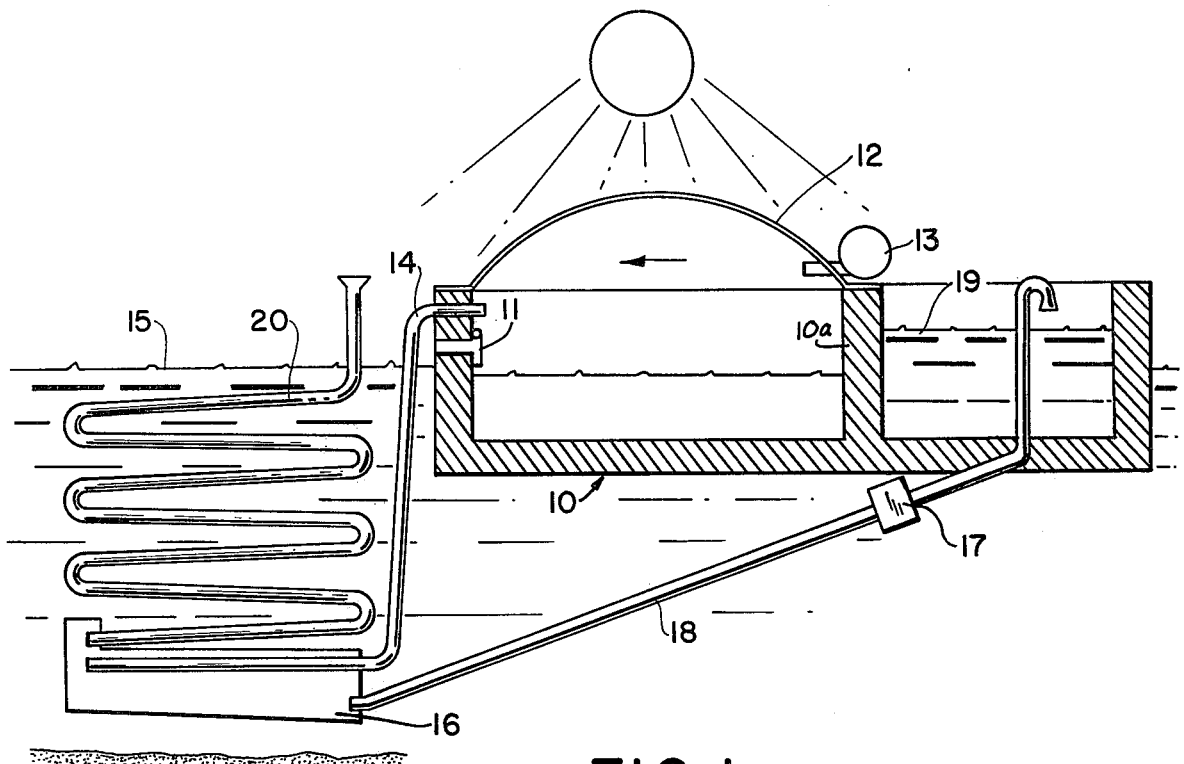
FIG. 1 is a block diagram of the water purification sytem of the present invention used to desalinate salt water.

In the drawings, FIG. 1 illustrates one phase of the invention which shows the apparatus of the system having portions disposed partially above the level of the sea or ocean in which the water purification system is located. It will thus be seen from the drawings that the system is integral and is preferably located in situ i.e. where the impure water exists in its natural state. The system comprises a tank 10 having a valve 11 in the enclosing liquid retaining wall 10a to permit the entry and containment of a certain amount of sea water maintaining it filled only to a certain level. The invention provides for the continuous processing of the sea water into potable water and for the retention in the tank 10 of a predetermined amount of sea water which will be available for such processing.

A cover 12 is disposed over the top of the tank 10. Preferably this cover 12 is of a flexible inflatable plastic material which will remain in the form of an encasing dome while the processing is proceeding. It will be understood, however, that any material which would permit the build-up of natural heating forces sufficient to vaporize the sea water contained within the tank would be suitable for the purposes of this invention. As illustrated, the rays of the sun itself may be used to provide a more than sufficient heat source, although it has been found that enough vaporization will take place under the appropriate enclosure even absent in extensive heat from the source of the sun.

The vaporized water will rise toward the top of the tank 10 under the cover 12. According to this invention, this vapor is not permitted to settle downwardly but rather as it is formed is constantly moved in the direction of the arrow by a directional blower 13 using only a modest amount of horsepower. This unique induced flow pattern maintains a constant area for the formation of new vapors while the old vapors are being moved for processing. As illustrated, the vapors are moved toward and into the pipe line 14 which extends into relative depth below the surface of the sea 15. The vapor as it passes down the pipe line 14 starts to condense into droplets of water without any need for an independent power source. The apparatus of this invention thus uses the changes in temperatures which exist between the temperature at the surface of the sea and that which exists at greater depth for the condensing effect. The reconstituted water which is pure then passes into the final condenser located on the surface of the bottom of the sea or is anchored by any suitable means (not shown).

A fluid pump 17 is used to continually pump the potable water from the condenser 16 through pipe 18 into a fresh water storage tank 19 where it may remain for any desirable period of time and will be subject to being moved or transported at will.

There are means for the escape of any fumes from the condensing apparatus via the pipe line 20 which rises to and above the surface of the sea.

The various sections of the water purification system of the present invention are linked together into one integral and integrated unit. The inter-connecting pipes may be of heavy duty solid plastic material or any other suitable material may be used which can safely and efficiently accommodate the transport of liquid passing therethrough. Thus the present invention contemplates using free heating sources such as the sun or heat generated under any containment preventing access from wind or rain, etc. This accomplishes the vaporization and purification of the sea water which then with a very minor energy expenditure is caused to move to a pipe line leading to a condensing area. The formation of droplets in the pipe line and the movement of the vapors therein are assisted by the forces of gravity and the condensing uses only the natural drop in temperature from the temperature existent near the crest of the sea to that which exists at the bottom. Thereafter fluid pumps are usable to transport the water from the condenser to the fresh water containing tank. The logistics of the system are such that it has been shown that enormous amounts of fresh water are obtainable in the circulating system from relatively small areas of salt or brackish water each day that the system is utilized.

Figure 2:
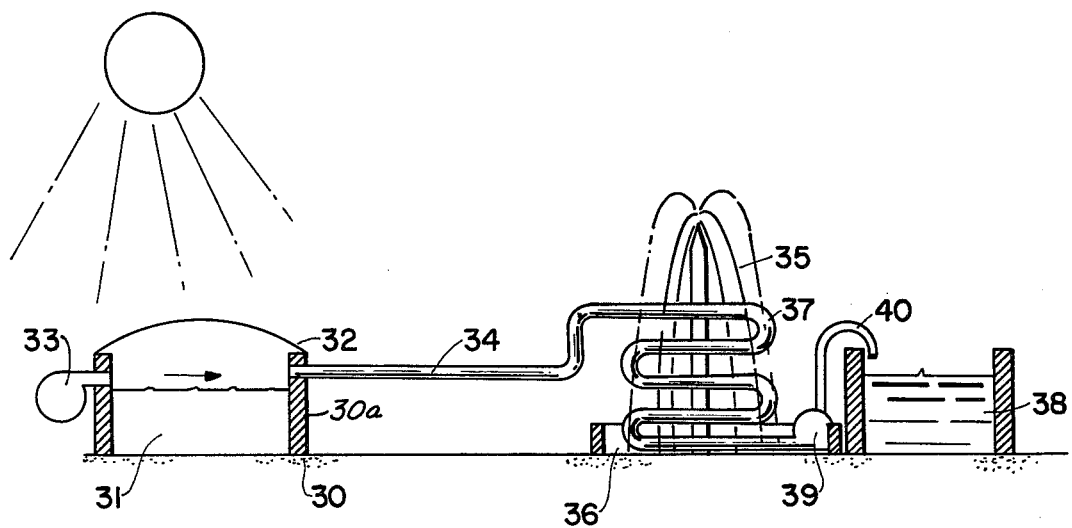
FIG. 2 is a block diagram of the water purification system of the present invention used in conjunction with an existing settling tank.

FIG. 2 shows a modified form of the present invention for the specific purpose of purifying and reclaiming water from an existing raw sewage settling tank. It is well known that such areas include water aeration spraying means insitu.

As shown in the drawings, there is an existing settling tank 30 having an enclosing retaining wall 30a into which raw sewage and the like 31 is normally conveyed for settling purposes on a continual basis. In accordance with this invention, a dome 32 is provided as a cover for the tanks. This dome may comprise the inflatable plastic material heretofore discussed or any suitable material for the intended purpose. The rays of the sun or the heat generated by the containment itself, causes the water in the settling tank to vaporize and rise towards the top of the container.

In accordance with the invention in order to provide a continuous processing of the impure water into potable water, a fan or blower 33 is disposed in one portion of the tank to move the vapors in the direction of the arrow to a pipe 34 which, as aforesaid, may be made of any suitable material for the safe, efficient and economic transportation of the vapor and liquid. The pipe is so constructed as to allow the vapors to pass over an extended period of time through the pipe which is being cooled by an existing aeration fountain 35. At this point, the lowering of the temperature caused by the coolness of the water in the aeration fountain, causes the vapors to be converted into droplets and ultimately into a body of water in the final condenser 36 after passing through the preliminary condenser formed by a sinesoidal section 37 of the pipe 34.

Thereafter, the water may be moved into a fresh water storage tank 38 by means of a pump 39 urging the water through and section of the pipe 40 to the storage tank. The fresh water may then be stored or transported at will.

In this version of the present invention, it is possible to store the fresh water in an underground tank, if desired, whereby the water from the condenser 36 may be fed into the tank without utilizing any pump means but simply by gravity feed from the condenser into the underground fresh water storage tank. In the modified forms of the invention shown in FIGS. 3 and 4 the water evaporation tank 10 is of the same construction as that set forth in FIG. 1 as are the pipe line and the like. However, as shown in the drawings means are provided to increase the evaporating area. Such means are illustrated in the form of cloth covered baffles 50 dispersed at random throughout the tank. These can serve as additional supports for the transparent covering. Primarily, however, when the baffles are covered with the porous material such as nylon cloth or burlap, they become saturated as a result of the capillary action by the sea water. As a consequence, without enlarging the space involved there is an increase in the evaporating area and a consequent increase in the rate of evaporation.

Figure 3:
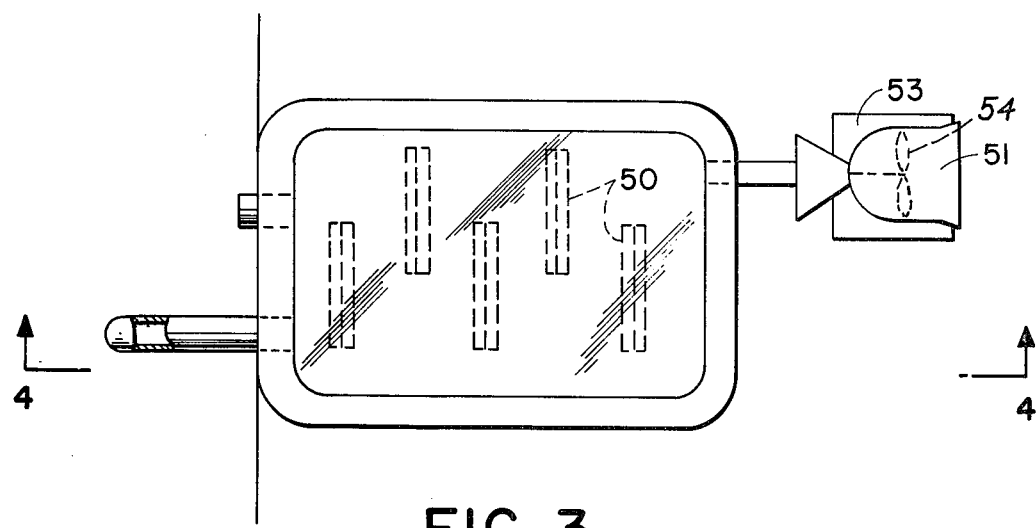
FIG. 3 is a block diagram top view of a modified form of the invention used to desalinate salt water.
Figure 4:
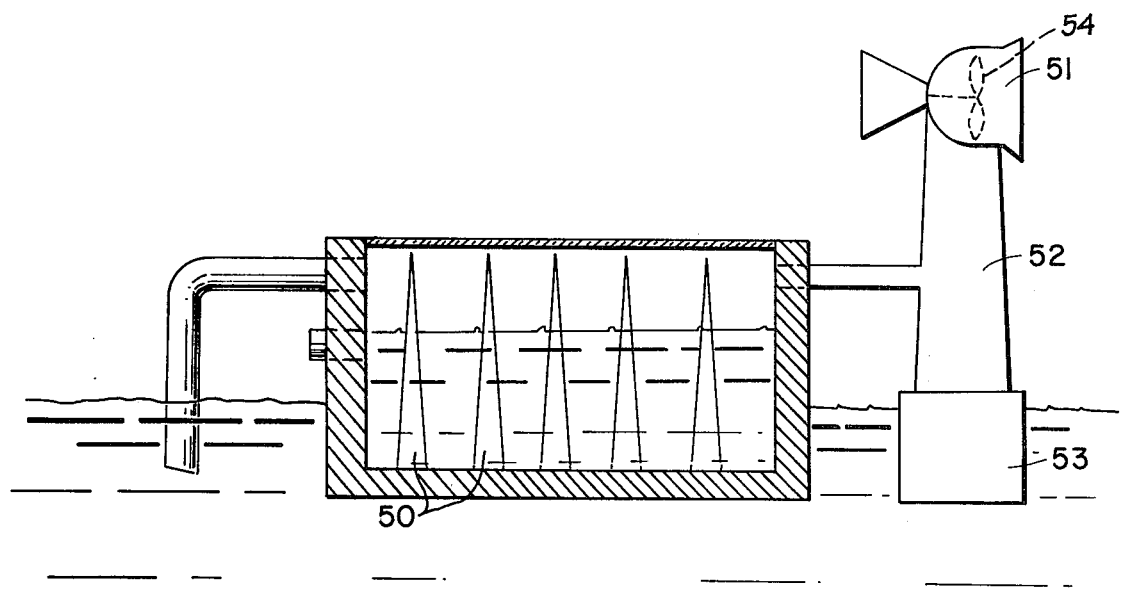
FIG. 4 is a block diagram side view of the modified form of the invention of FIG. 3.

As also shown in FIGS. 3 and 4 the pump and blower arrangement illustrated with regard to FIG. 1 which does use some external energy although of a minimum type, is replaced by a driving arrangement 51 which is maintained in the direction of the prevailing winds. A fan 54 (shown in phantom) internally of the vane 51 is activated by the force of the prevailing winds coming into the vane 51. This causes the circulation of the flow of the air derived only from wind forces over the surface of the solar energy system. The air passes through duct 52 across the surface of the tank in the same fashion as described with relation to the blower 13 in FIG. 1. The entire unit is maintained in floating position on support 53 although, of course, it may be otherwise secured if desired.

Thus, in FIGS. 3 and 4 structure is presented in accordance with the present invention which provides for evaporation at a greater rate in a confined area with the use of cloth covered baffles. Also the natural wind currents are utilized to drive the air over the evaporation area either alone or as a supplement to the blower pump. In order to further conserve energy it is possible with the present invention to use waste heat gases from atomic reactors, electric generating plants or exhaust gases from internal combustion engines (not shown) which could be directed into the driving arrangement 51 in place of the prevailing winds. Such structure would somewhat enhance the yield of the system and supplement the heating from the rays of the sun.

It will thus be seen that the present invention provides an efficient, simple and yet entirely dependable method of purifying salt water, brackish water or even water from raw sewage to make it potable. The unit is an integral one and uses available heat, gravity and other means in their normal state and only a minimum amount of energy for accomplishing the beneficial purification results.

The contents of the evaporation tank of the invention, which as is clear from the foregoing are provided therein as a substantially static body of impure water during operation, may be from time to time drained into an open tank so that a final solar evaporation can occur. This will enable the reclamation of salt. Thus, the concentrated brine resulting from the primary evaporation may therefore be used for any suitable commercial purpose.

Of course, if desired, a regulatory system (not shown) of the conventional type may be used to sense the level of the humidity in the tank and thereby regulate the speed of the blower fan used to move the molecules of water emerging above the surface of the water. Furthermore, the system of the present invention operates during the night as well as during daylight hours to purify the water passing therethrough. In addition, various surface tension breaking chemicals may be used to reduce the surface tension of the sea water being processed and thus accelerate the evaporation process.

It is to be understood of the term "potable" water is used herein to describe the very pure water obtainable with the use of the system of the present invention. However, the term "potable" is not to be considered as a restriction but rather is to be interpreted as meaning a form of processed water which can also be used for irrigation and similar non-drinking purposes.

It will also be understood that while examples of the present invention have been described in detail, various changes and modifications may be made while not departing from the spirit and scope of the present invention which is to be limited only by the scope of the appended claims.

I claim:

1. An integral water purification system comprising apparatus located in a constantly existing source of impure water and including:

a container having a lower portion provided with enclosing liquid retaining wall means for holding a substantially static body of impure water therewithin in corresponding static condition and closing off liquid flow of such water therefrom and further having valve means for continual replenishment of said water in said container from the constantly existing source of the impure water, a cover of flexible plastic material for said container for providing heat accumulation within said container whereby said water is directly vaporized and rises as a vapor to the upper portion of said container above such static body of impure water, means comprising cloth covered baffles in the container for increasing the evaporation area therewithin, a blower for moving said vapor across the upper portion of said container above such static body of impure water, a vapor pipe for receiving and transporting said vapor from an area of one natural temperature through an area of a lower natural temperature whereby said vapors are condensed into water, and means including a liquid pipe and a pump for transporting said condensed water to a storage tank.

2. The integral water purification system of claim 1 in which the pipe for receiving and transporting the vapors extends from adjacent the surface of the source of the impure water to a deeper and cooler depth and wherein a condensing container is disposed in the depths of the source of the impure water at the deeper end of said pipe for receiving and transporting said vapor.

3. The integral water purification system of claim 1 including an intermediate water aerating system and wherein the pipe for receiving and transporting said vapors passes indirectly through said water aerating system.

4. The integral water purification system of claim 1 in which the blower comprises means driven by natural wind forces for blowing air across the container above the static body of impure water.

* * * * *